United States Patent [19]

Dearman

[11] Patent Number: 4,497,115
[45] Date of Patent: Feb. 5, 1985

[54] WELDER'S MISMATCH GAUGE

[76] Inventor: Timothy C. Dearman, P.O. Box 937, Pearland, Tex. 77581

[21] Appl. No.: 473,687

[22] Filed: Mar. 9, 1983

[51] Int. Cl.³ ................................................. G01B 3/20
[52] U.S. Cl. ................................ 33/174 R; 33/143 J; 33/169 D
[58] Field of Search ............ 33/143 M, 143 J, 169 R, 33/169 B, 169 D, 174 R, 180 R

[56] References Cited

U.S. PATENT DOCUMENTS

| 752,823 | 2/1904 | Cary | 33/143 M |
|---|---|---|---|
| 2,175,650 | 10/1939 | Schaber | 33/169 B |
| 2,293,411 | 8/1942 | Spillman | 33/143 M |
| 2,467,263 | 4/1949 | Krisanda | 33/143 M |
| 3,090,126 | 5/1963 | Kernoski | 33/149 D |
| 3,869,801 | 3/1975 | Lycan | 33/174 R |
| 3,921,302 | 11/1975 | Wilkerson | 33/169 R |
| 4,165,566 | 8/1979 | Lycan | 33/169 B |

FOREIGN PATENT DOCUMENTS

| 618811 | 3/1927 | France | 33/143 M |
|---|---|---|---|
| 901629 | 8/1945 | France | 33/143 J |

Primary Examiner—Richard R. Stearns
Attorney, Agent, or Firm—Learman & McCulloch

[57] ABSTRACT

A welder's gauge for detecting mismatches between two members having a gap therebetween and which are to be welded together comprises a pair of side-by-side elongate body members guided for relative axial movements. Feelers project from the body members and terminate in feet that can be passed through the gap following which they can be turned to span the gap and engage the surfaces of the two members to be welded together. Differences in the levels of the two surfaces are indicated by indicia on the body members. The feelers are removable from the respective body members for repair or replacement.

12 Claims, 5 Drawing Figures

WELDER'S MISMATCH GAUGE

BACKGROUND OF THE INVENTION

When welding together two members, such as a pair of pipe lengths, a pipe length and a fitting, two fittings, and the like, it is not uncommon for the confronting ends of the two members to be mismatched. The mismatch may be due to one or both of the members being out-of-round, or to differences in wall thicknesses, or to differences in inside and outside diameters. Most of these mismatches can be corrected, or at least minimized, if the welder knows the extent of the mismatch and where it occurs. Various types of instruments and gauges have been proposed to assist the welder in locating the mismatch. Typical of such gauges are those disclosed on pages 25-28 of The Dearman System and in Lycan Pat. Nos. 3,869,801 and 4,165,566.

Known gauges of the type referred to utilize relatively movable body members terminating at corresponding ends in feelers or legs that project beyond the body members and terminate in outwardly extending feet. The legs must be of such thickness as to pass through a relatively narrow gap provided between the two members that are to be welded together, and they also must be of such size as to enable the gauge to be rotated through about 90° so as to enable the feet to span the gap and project beyond both sides thereof for engagement with the inner surfaces of the members that are to be welded together. Because of these requirements the legs of the gauges must be relatively narrow or thin. As a result, the legs or feet, or both, are prone to be damaged, thereby resulting in inaccuracies in the use of the gauges.

An object of the present invention is to provide a welder's gauge which has all the advantages of previously known gauges adapted for similar purposes, but which makes possible the repair or replacement of those parts of the gauge which are most likely to become damaged, thereby avoiding the necessity of replacing an entire gauge upon one or both of its feelers being damaged.

SUMMARY OF THE INVENTION

A welder's gauge constructed in accordance with the invention comprises a pair of elongate body members arranged side-by-side for relative axial movements. The body members are coupled together by guides which maintain them parallel to one another, and at least one of the guides is fitted with releasable means for locking the body members in any selected one of a number of different positions of axial adjustment. Indicia carried by the respective body members enables the extent of relative adjustment to be determined.

Each body member is fitted at one end with an elongate feeler or leg which extends in prolongation of the body member and terminates in a right angular foot. The feet of the respective legs extend in opposite directions so as to be able to span a gap between a pair of members that are to be welded together, but the dimensions of the legs and the feet are such as to enable them to pass through such gap when the gauge is so oriented that the feet parallel the gap. The gauge legs are removably secured to the respective body members so as to enable a damaged leg to be removed for repair or replacement.

DESCRIPTION OF THE DRAWINGS

A welder's gauge constructed in accordance with a preferred embodiment of the invention is disclosed in the following description and illustrated in the accompanying drawings, wherein.

DETAILED DESCRIPTION

Figure 1:
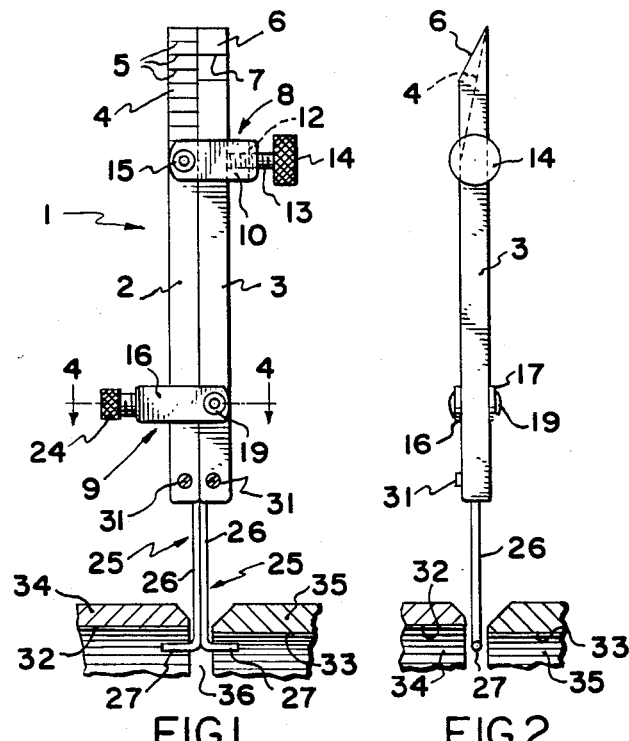
FIG. 1 is an elevational view of the gauge in the position it occupies when in use.

A preferred embodiment of the gauge is indicated generally by the reference character 1 and comprises a pair of elongate, side-by-side body members 2 and 3 that are preferably square in cross section. One end of the body 2 is tapered, as at 4, and is provided with a plurality of indicia 5 that are uniformly spaced apart for a purpose presently to be explained. The body member 3 has a beveled end 6 provided with a reference mark or line 7 that cooperates with the indicia 5.

The members 2 and 3 are coupled to one another by two guides 8 and 9. The guide 8 includes a pair of parallel arms 10 and 11 joined at corresponding ends by a bridge 12 provided with a tapped opening through which extends the threaded shank 13 of a locking bolt 14. The arms 10 and 11 span the member 3 and are pivoted to the member 2 by a rivet 15. The member 3 is slidable through the guide 8 but may be locked in frictional engagement against the member 2 by means of the locking bolt 14.

The guide 9 includes a pair of parallel arms 16 and 17 joined at corresponding ends by a bridge 18 and pivoted at their other ends to the member 3 by a rivet 19. Preferably, the bridge 18 has a tapped opening therein which extends a threaded post 20 having a cavity 21 within which is a spring 22 and a restraining ball 23 which bears against the confronting surface of the member 2. A head 24 is fixed to the post 20 to facilitate rotation of the latter. The ball 23 constantly bears against the member 2 and imposes a constant, but yielding, frictional force between the members 2 and 3 so as to enable such members to be lightly restrained independently of the locking bolt against movement from any selected position of relative axial adjustment.

The gauge includs a pair of feelers or legs 25 each of which has a shank 26 terminating at one end in a foot 27 bent at right angles to the shank 26. Each shank 26 terminates at its opposite end in a right angular finger 28 that parallels the foot 27. The feet 27 extend in opposite directions from each other.

Means for mounting the feelers 25 includes, in each case, a transverse socket 29 in the associated body member 2 or 3 and an axial groove 30 formed in that face of the body member which confronts its companion body member. The depth of the groove 30 corresponds to the thickness of the shank 26 of the associated leg 25 and the length of the finger is such as to be accommodated within the socket 29. The transverse dimension of the two legs 25 thus is at a minimum inasmuch as the confronting sides of the legs 25 are flush with the associated sides of the members 2 and 3.

An adjustable anchor screw 31 is threaded into a tapped opening formed in the associated body member, the opening being in communication with the socket 29 so as to enable the set screw to seat on the finger 28 and secure the leg 25 to the associated body member. If desired, the anchor screw 31 associated with the body member 2 may be longer than the other anchor screw so as to project beyond the confines of the body member for engagement with the guide 9 and prevent inadvertent withdrawal of the member 2 from the guide 9. Any other suitable retaining means may be utilized for such purpose.

Figures 2, 3:
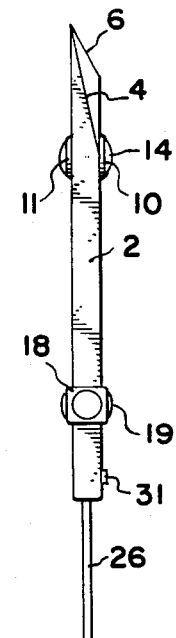
FIG. 2 is an elevational view illustrating one side of the gauge and rotated 90° clockwise from the position shown in FIG. 1.
FIG. 3 is a side elevational view illustrating the opposite side of the gauge.
Figure 4:
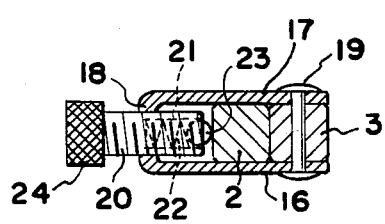
FIG. 4 is an enlarged sectional view taken on the line 4—4 of FIG. 1.
Figure 5:
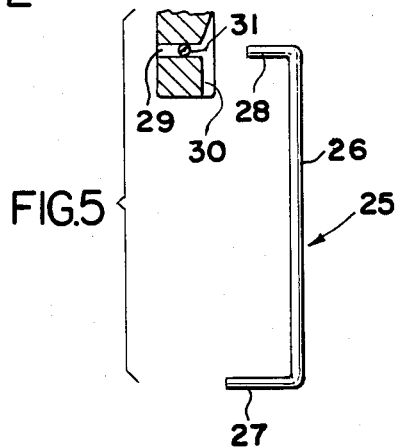
FIG. 5 is an enlarged sectional view through one of the body members of the gauge.

The gauge is illustrated in FIGS. 1 and 2 as being in condition to indicate the difference in elevation, commonly referred to as the "high-low" or mismatch between the inner surfaces 32 and 33 of two pipe lengths 34 and 35 of different wall thickness and separated from one another by a gap 36.

To condition the gauge for use, the members 2 and 3 are adjusted to the relative positions shown in FIG. 1 and either locked in that position by manipulation of the locking bolt 14 or simply held in that position under the force exerted by the spring pressed ball 23. The gauge then is turned to the position shown in FIG. 2 so that the feet 27 parallel the gap 36 between the two pipe lengths 34 and 35, thereby enabling the feet 27 to pass through the gap and occupy a level lower than that of either of the inner surfaces 32 and 33 of the respective pipe lengths. Thereafter, the gauge 1 may be turned through 90° so as to locate the feet 27 in positions in which they span and extend beyond both sides of the gap 36, as is shown in FIG. 1. In this position of the gauge the latter may be elevated from a position shown in FIG. 1 whereupon the right-hand foot 27 will engage the inner surface 33 of the pipe 35 before the left-hand leg 27 engages the inner surface 32 of the pipe 34. Thus, the body member 2 may be moved upwardly following the engagement of the right-hand foot 27 with the surface 33, whereupon the indicia 5 and 7 may be read to indicate the extent to which the surfaces 32 and 33 differ from each other. Should it be desired to do so, the members 2 and 3 may be locked in the relatively adjusted positions so as to facilitate reading of the indicia 5 and 7. A number of similar readings may be taken at circumferentially spaced points to ascertain the location and extent of the mismatch.

Once the locations and extent of the mismatch in the levels of the surfaces 32 and 33 are determined, appropriate steps may be taken to eliminate the mismatch or, if it cannot be eliminated, to equalize as much as possible the extent of the mismatch around the periphery of the pipe sections.

In the event one or both of the feelers 25 becomes bent or broken, it or they may be removed from the respective body members and either repaired or replaced. Thus, damage to one or the other of the feelers does not necessitate replacement of the entire gauge.

The disclosure is representative of a presently preferred form of the invention, but is intended to be illustrative rather than definitive thereof. The invention is defined in the claims.

I claim:

1. A gauge for use with two sections to be welded together and having confronting ends spaced by a gap, said gauge comprising a pair of elongate, side-by-side members confronting one another; means coupling said members to one another for relative axial movement; locking means for releasably locking said members in a selected one of a number of axially adjusted positions; restraining means acting on said members and restraining relative axial movement thereof independently of said locking means; a gauge leg for each of said members; and means separably securing said legs to the respective members, each of said legs having a thickness less than that of its associated member and being flush with that side of its associated member which confronts the other of said members, said legs extending adjacent and parallel to one another from corresponding ends of the respective members and terminating in outwardly turned feet projecting in opposite directions, said legs and feet being of such thickness as to pass through said gap when said feet are positioned parallel to said gap and the combined length of said feet being greater than the width of said gap to enable said feet to span and project beyond both sides of said gap when said feet are positioned transverse to said gap.

2. A gauge according to claim 1 wherein said securing means for each of said legs comprises a socket formed in the associated member and removably accommodating a part of the associated leg.

3. A gauge according to claim 2 including adjustable anchor means in communication with the socket of each member and engageable and disengageable with the associated leg.

4. A gauge according to claim 2 wherein each of said legs has a bent end that is accommodated in the socket of the associated member.

5. A gauge according to claim 4 including adjustable means in communication with the socket of each member and engageable and disengageable with the bent end of the associated leg.

6. A gauge according to claim 1 wherein said restraining means comprises a body bearing against one of said members, and resilient means urging said body in a direction toward said one of said members.

7. A gauge for use with two sections to be welded together and having confronting ends spaced by a gap, said gauge comprising a pair of elongate members; means coupling said members side-by-side for relative axial movement thereof; a pair of elongate gauge feelers; and means removably securing said feelers to respective ones of said members in prolongation thereof and parallel to one another, said securing means comprising a transverse socket in the respective members between the ends thereof and in which the associated feeler is removably accommodated, each of said feelers terminating at its end remote from its associated member in a laterally turned foot, the foot of one of said members extending in a direction away from the foot of the other of said members, the combined lengths of the respective feet being greater than the width of said gap.

8. A gauge according to claim 7 including adjustable anchor means carried by each of said members and extending into the associated socket in engagement with the feeler therein.

9. A gauge according to claim 7 wherein each of said members has in one side thereof an elongate groove extending from said socket to that end of such member beyond which the associated feeler extends.

10. A gauge according to claim 7 including means for retaining said members in a selected one of a number of axially adjusted positions.

11. A gauge according to claim 10 wherein said retaining means is spring biased.

12. A gauge for use with two members to be welded together and having confronting ends spaced by a gap, said gauge comprising a pair of elongate bodies; means coupling said bodies in parallel, face-to-face engagement for relative axial movement, each of said bodies having in that face thereof which confronts the other of said bodies an axially extending groove; a pair of elongate gauge feelers accommodated in the respective grooves, each of said feelers having a thickness corresponding to the depth of its associated groove whereby said feelers are flush with the confronting faces of said bodies; and means for retaining said feelers in the respective grooves, each of said feelers terminating at its end remote from its associated body in a laterally turned foot, the foot of one of said feelers extending in a direction away from the foot of the other of said feelers, the combined lengths of the respective feet being greater than the width of said gap, and the combined thicknesses of said feelers being less than the width of said gap.

* * * * *